(12) United States Patent
Kim et al.

(10) Patent No.: US 7,158,203 B2
Kim et al.
(45) Date of Patent: Jan. 2, 2007

(54) METHOD OF FABRICATING PIXEL ELECTRODE IN LIQUID CRYSTAL DISPLAY

(75) Inventors: Hye Young Kim, Daejeon-shi (KR); You Shin Ahn, Kyounguangbuk-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/029,144

(22) Filed: Dec. 28, 2001

(65) Prior Publication Data

US 2002/0085168 A1 Jul. 4, 2002

(30) Foreign Application Priority Data

Dec. 30, 2000 (KR) ............................... 2000-86923

(51) Int. Cl.
*G02F 1/1343* (2006.01)
*G02F 1/136* (2006.01)
*G02F 1/13* (2006.01)

(52) U.S. Cl. ............... 349/143; 349/43; 349/187

(58) Field of Classification Search ............ 349/187, 349/43, 143; 438/30; 204/192.29, 192.35, 204/192; 205/223
See application file for complete search history.

(56) References Cited

U.S. PATENT DOCUMENTS

| 4,065,600 A | * | 12/1977 | King et al. | 428/432 |
|---|---|---|---|---|
| 5,135,581 A | * | 8/1992 | Tran et al. | 136/256 |
| 5,289,300 A | * | 2/1994 | Yamazaki et al. | 359/51 |
| 5,407,602 A | * | 4/1995 | Cava | 252/518 |
| 5,612,799 A | * | 3/1997 | Yamazaki et al. | 349/42 |
| 5,628,933 A | * | 5/1997 | Carter et al. | 252/519.1 |
| 5,667,853 A | * | 9/1997 | Fukuyoshi et al. | 428/1 |
| 5,972,527 A | * | 10/1999 | Kaijou et al. | 428/697 |
| 6,001,539 A | * | 12/1999 | Lyu et al. | 430/317 |
| 6,188,108 B1 | * | 2/2001 | Yoon et al. | 257/347 |
| 6,225,150 B1 | * | 5/2001 | Lee et al. | 438/153 |
| 6,433,842 B1 | * | 8/2002 | Kaneko et al. | 349/43 |
| 6,466,293 B1 | * | 10/2002 | Suzuki et al. | 349/144 |
| 2001/0029054 A1 | * | 10/2001 | Maeda et al. | 438/17 |
| 2001/0030717 A1 | * | 10/2001 | Kaneko et al. | |
| 2001/0030723 A1 | * | 10/2001 | Koma | 349/113 |
| 2002/0085142 A1 | * | 7/2002 | Kim et al. | 349/43 |

* cited by examiner

*Primary Examiner*—Huyen Ngo
*Assistant Examiner*—Mike Qi
(74) *Attorney, Agent, or Firm*—Birch,Stewart,Kolasch, and Birch, LLP

(57) ABSTRACT

A method of fabricating a pixel electrode of a liquid crystal display uses an etchant that has low damage to metals to thereby enhance yields. In the method, a protective film covers a switching device, and a contact hole is defined at the protective film in such a manner to expose one electrode of the switching device. The pixel electrode, connected via the contact hole to the one electrode of the switching device, is formed on the protective film by using a low-temperature process in which a Hydrogen-containing gas is injected within a vacuum chamber. Accordingly, the etching process time can be shortened and damage to the metal can be virtually eliminated.

14 Claims, 6 Drawing Sheets

METHOD OF FABRICATING PIXEL ELECTRODE IN LIQUID CRYSTAL DISPLAY

BACKGROUND OF THE INVENTION

1. Field of the Invention

This invention pertains to a method of fabricating a liquid crystal display having a pixel electrode, wherein an etchant having low damage to metals enhances yields of the pixel electrode and a thin film transistor.

2. Description of the Related Art

A liquid crystal display (LCD) with an active matrix driving system uses thin film transistors (TFT's) as switching devices to display a natural moving picture. Since such a LCD can be made into a device having a smaller size than the existent Brown tube, it has been widely used as a monitor for a personal computer or a notebook computer as well as for office automation equipment such as a copy machine or portable equipment such as a cellular phone or a pager.

FIG. 1A to FIG. 1D show a conventional process of fabricating a LCD.

Referring to FIG. 1A, aluminum (Al) or copper (Cu) is deposited on a transparent substrate 11 at a thickness of about 1500 to 4000 Å by a sputtering technique to form a metallic thin film. The metallic thin film is patterned by photolithography, including a wet method step, to thereby form a gate electrode 13 on the transparent substrate 11.

Referring to FIG. 1B, a gate insulating film 15, an active layer 17 and an ohmic contact layer 19 are sequentially formed on the transparent substrate 11 by a chemical vapor deposition (CVD) technique in a manner to cover the gate electrode 13. A gate insulating film 15 is formed by depositing an insulation material such as silicon oxide ($SiO_x$) or silicon nitride ($SiN_x$) on the transparent substrate 11 at a thickness of about 3000 to 5000 Å. The active layer 17 is formed by depositing undoped amorphous silicon or undoped polycrystalline silicon onto a portion corresponding to the gate electrode 13 on the gate insulating film 15 at a thickness of about 1500 to 2000 Å. The ohmic contact layer 19 is formed by depositing an amorphous silicon or a polycrystalline silicon doped with a n-type or p-type impurity at a high concentration onto each side portion on the active layer 17 of a thickness of about 200 to 500 Å. The ohmic contact layer 19 is not formed at a middle portion of the active layer 17.

The ohmic contact layer 19 and the active layer 17 are patterned by photolithography, including anisotropic etching, in such a manner to remain only at a portion corresponding to the gate electrode 13.

Referring to FIG. 1C, a metal such as molybdenum (Mo), chromium (Cr), titanium (Ti) or tantalum (Ta), etc., or a molybdenum alloy such as MoW, MoTa or MoNb, etc. is deposited on the gate insulating film 15 at a thickness of about 1000 to 2000 Å by CVD or sputtering to cover the ohmic contact layer 19, thereby forming a metallic thin film. In this case, the ohmic contact layer 19 makes ohmic contact with the metallic thin film.

Subsequently, a photoresist pattern 25 is formed at a portion corresponding to each side of the gate electrode 13 by coating photoresist on the metallic thin film and then exposing and developing it. The metallic thin film is wet etched according to the photoresist pattern 25 to form source and drain electrodes 21 and 23. The exposed portion of the ohmic contact layer 19 is dry etched according to the photoresist and the source and drain electrodes 21 and 23 in a manner so as to expose the active layer 17. At this time, the ohmic contact layer 19 is etched to be inconsistent with, i.e., offset to, the side surface of the photoresist pattern 25, and the active layer 17 at the portion corresponding to the gate electrode 13 between the unetched ohmic contact layer 19 and the active layer 17, thereby forming a channel.

Referring to FIG. 1D, the photoresist pattern 25 is removed. A passivation layer 27 is formed on the gate insulating layer 15 so as to cover the source and drain electrodes 21 and 23. The passivation layer 27 is made from an inorganic insulating material such as silicon nitride silicon oxide, etc. The passivation layer 27 can also be made from an organic insulation material having a small dielectric constant such as an acrylic organic compound, i.e., an acrylic, TEFLON (polytetrafluoroethylene), BCB (benzocyclobutene), CYTOP (fluoropolymer resin) or PFCB (perfluorocyclobutane), etc. Since step coverage between the active layer 17 and the source and drain electrodes 21 and 23 becomes reduced due to the ohmic contact layer 19, a surface evenness of the passivation layer 27 increases.

The, the passivation layer 27 is patterned by photolithography to define a contact hole 28 for exposing the drain electrode 23. A transparent conductive material such as indium tin oxide (ITO), tin oxide (TO) or indium zinc oxide (IZO) is deposited onto the passivation layer 27 in a manner to contact the drain electrode 23 via the contact hole 28. The transparent conductive material is then patterned by photolithography to form a pixel electrode 29.

Prior to deposition of the pixel electrode 29, pre-heating is first performed. After pre-heating, the pixel electrode 29 is deposited in a high-temperature vacuum chamber at a deposition temperature of more than 400° C. Upon deposition at high temperature, the pixel electrode 29 crystallizes.

This deposition process results in the pixel electrode 29 having inferior etch characteristics due to the interplay of polyamorphous and crystalline states. As a result, it becomes necessary to use a strong acid (HCl series) etchant or to etch for an extended time period. After this etch process, the gate electrode is damaged and a metallic residue remains, thereby causing problems relating to uniformity and subsequently affect to the post process. As a result, there is a need to manufacture liquid crystal displays utilizing etch technologies that minimize damage to the display structure.

SUMMARY OF THE INVENTION

Accordingly, the present invention provides a method of fabricating a pixel electrode of a liquid crystal display wherein a weak acid etchant having a low metal damage characteristic is used to etch the pixel electrode to yield an etching process having a short etch time to thereby prevent damage to the metal.

The invention, in part, pertains to a method of fabricating a pixel electrode in a liquid crystal display including a switching device for driving the pixel electrode, the method including depositing a protective film over a substrate to cover the switching device, defining a contact hole in the protective film to expose one electrode of the switching device, and forming the pixel electrode connected, via the contact hole, to said one exposed electrode. The pixel electrode is formed by placing the substrate in a vacuum chamber and injecting Hydrogen-containing gas at a temperature of less than about 400° C. The method further includes forming a gate electrode over the substrate, entirely depositing a gate insulating film over the substrate to cover the gate electrode, and continuously depositing an active layer and an ohmic contact layer to overlap the gate electrode.

The invention, in part, pertains to the pixel electrode having an amorphous structure. The pixel electrode is etched with a weak acid etchant.

The invention, in part, pertains to the substrate having a temperature of less than about 200° C., preferably between about 50° C. and 150° C., when forming the pixel substrate.

The invention, in part, pertains to the protective layer being a passivation layer made from an inorganic insulation material or an organic insulation material that can be one of silicon nitride, silicon oxide, an acrylic, polytetrafluoroethylene, benzocyclobutene, fluoropolymer resin or perfluorocyclobutane. The pixel electrode can be a transparent conductive material such as indium tin oxide, tin oxide or indium zinc oxide. The switching device has source and drain electrodes, and the source and drain electrodes can be Mo, Cr, Ti, Ta, MoW, MoTa or MoNb.

The invention, in part, pertains to a pixel electrode of a liquid crystal display, which has a substrate, a switching device over the substrate, a protective film over a substrate covering the switching device, and a contact hole in the protective film, the contact hole exposing one electrode of the switching device, the pixel electrode being connected, via the contact hole, to said one exposed electrode, wherein the pixel electrode is formed by placing the substrate in a vacuum chamber and injecting Hydrogen-containing gas at a temperature of less than about 400° C.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention. The drawings illustrate embodiments of the invention and together with the description serve to explain the principles of the embodiments of the invention.

DETAILED DESCRIPTION

Advantages of the present invention will become more apparent from the detailed description given herein after. However, it should be understood that the detailed description and specific examples, while indicating preferred embodiments of the invention, are given by way of illustration only, since various changes and modifications within the spirit and scope of the invention will become apparent to those skilled in the art from this detailed description.

FIG. 2A to FIG. 2G are sectional views for explaining a method of fabricating a pixel electrode in a liquid crystal display according to a preferred embodiment of the present invention.

Figure 1A:
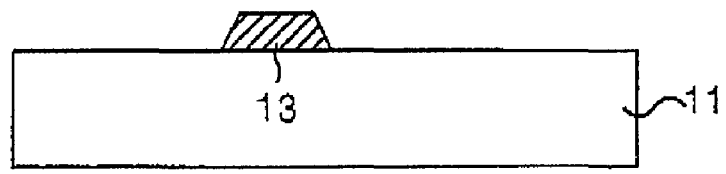
FIG. 1A to FIG. 1D are sectional views for explaining a conventional art method of fabricating a pixel electrode in a liquid crystal display.
Figure 1B:
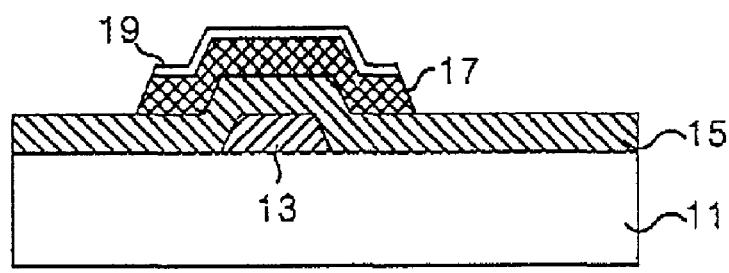
Figure 1C:
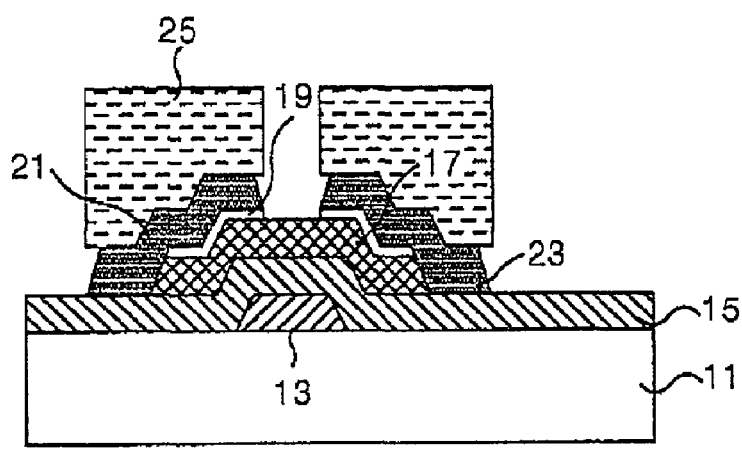
Figure 1D:
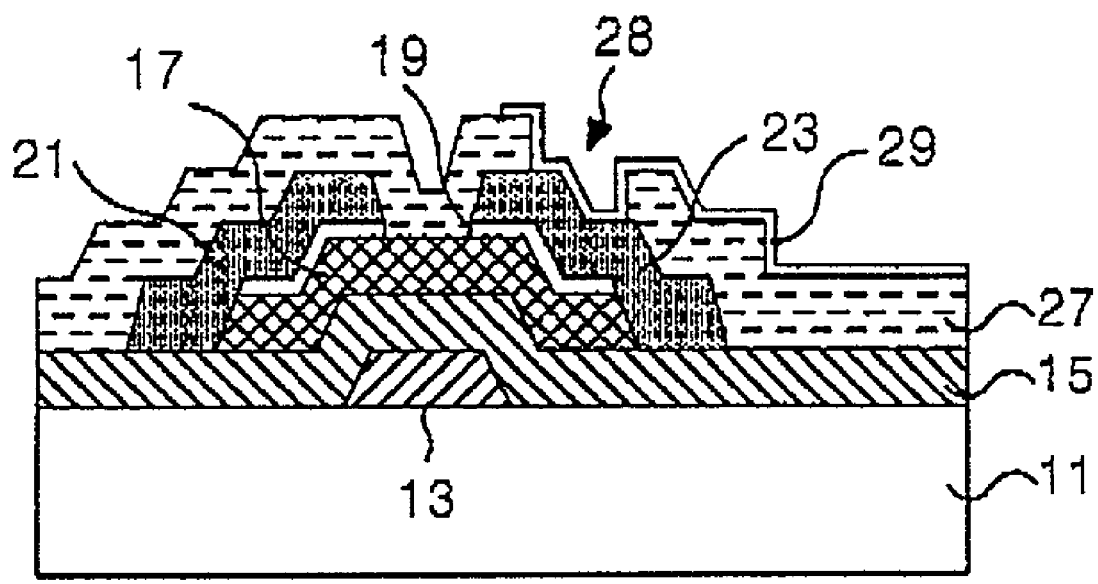
Figure 2A:
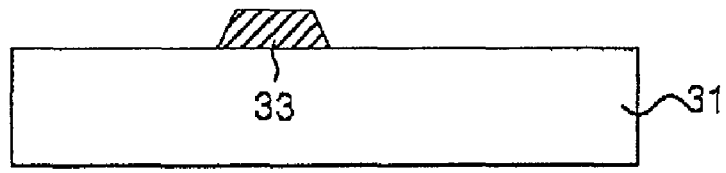
FIG. 2A to FIG. 2G are section views for explaining a method of fabricating a pixel electrode in a liquid crystal display according to a preferred embodiment of the present invention.

Referring to FIG. 2A, aluminum (Al) or copper (Cu) is deposited over a transparent substrate 31 at a thickness of about 1500 to 4000 Å, typically by a sputtering technique, to form a metal thin film. The metal thin film is patterned by photolithography, including a wet method step, to thereby form a gate electrode 33 over the transparent substrate 31.

Figure 2B:
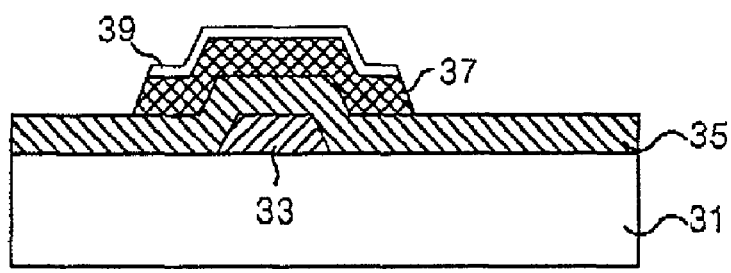

Referring to FIG. 2B, a gate insulating film 35, an active layer 37 and an ohmic contacts layer 39 are sequentially formed over the transparent substrate 31 by, e.g., a chemical vapor deposition (CVD) technique so as to cover the gate electrode 33. The gate insulating film 35 is formed by depositing an insulation material such as silicon oxide ($SiO_x$) or silicon nitride ($SiN_x$) over the transparent substrate 31 into a thickness of about 3000 to 5000 Å. The active layer 37 is formed by depositing undoped amorphous silicon or undoped polycrystalline silicon onto a portion corresponding to the gate electrode 33 on the gate insulating film 35 at a thickness of about 1500 to 2000 Å. An ohmic contact layer 39 is formed by depositing amorphous silicon or polycrystalline silicon doped with a n-type or p-type impurities at high concentration onto each side portion, other than the middle portion thereof, on the active layer 37 at a thickness of about 200 to 500 Å.

The ohmic contact layer 39 and the active layer 37 are patterned by photolithography, including an anisotropic etch, in such a manner as to leave only a portion corresponding to the gate electrode 13.

Figure 2C:
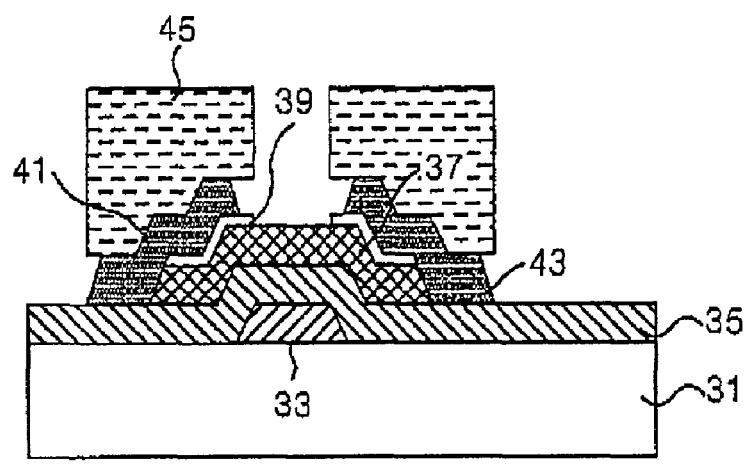

Referring to FIG. 2C, a metal such as molybdenum (Mo), chromium (Cr), titanium (Ti) or tantalum (Ta), etc., or a molybdenum alloy such as MoW, MoTa or MoNb, etc. is deposited on the gate insulating film 35 at a thickness of about 1000 to 2000 Å by CVD or sputtering to cover the ohmic contact layer 39, thereby forming a metallic thin film. In this case, the ohmic contact layer 39 makes an ohmic contact with the metallic thin film.

Subsequently, a photoresist pattern 45 is formed at a portion corresponding to each side of the gate electrode 13 by coating photoresist on the metallic thin film and then exposing and developing the photoresist. The metallic thin film is wet etched through the photoresist pattern 45 to form source and drain electrodes 41 and 43. The exposed portion of the ohmic contact layer 39 is dry etched through the photoresist and the source and drain electrodes 41 and 43 to expose the active layer 37. At this time, the ohmic contact layer 39 is etched to be inconsistent, i.e., offset, with the side surface of the photoresist pattern 45, and the active layer 37 at the portion corresponding to the gate electrode 33 between the ohmic contact layer 39 remains unetched to form a channel over the active layer 37.

Figure 2D:
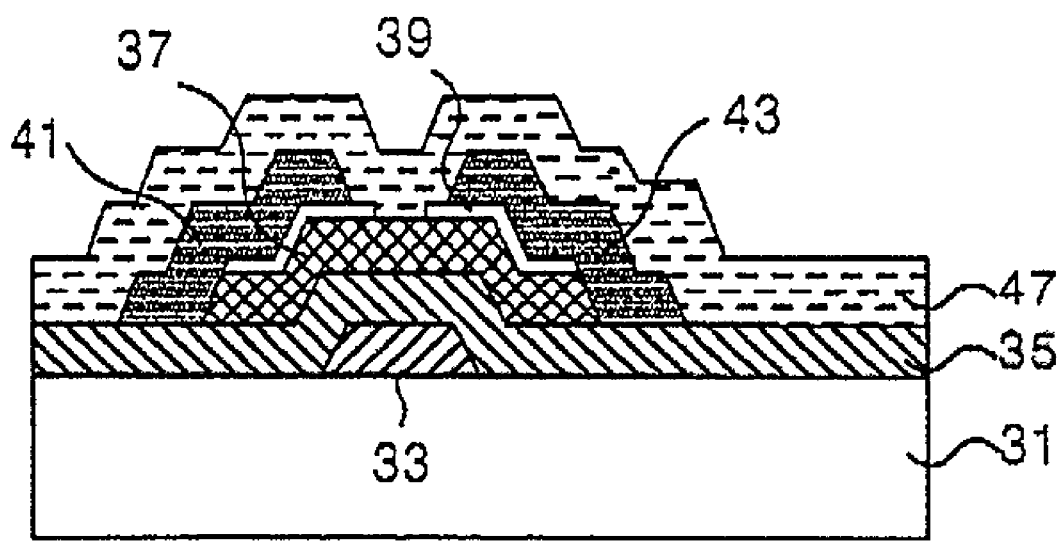

Referring to FIG. 2D, the photoresist pattern 45 is removed. A passivation layer 47 is formed on the gate insulating layer 35 to cover the source and drain electrodes 41 and 43. The passivation layer 47 is made from an inorganic insulating material that can be but is not restricted to silicon nitride or silicon oxide, or an organic insulation material having a small dielectric constant that can be but is not restricted to an acrylic organic compound (acrylic), TEFLON (polytetrafluoroethylene), BCB (benzocyclobutene), CYTOP (fluoropolymer resin) or PFCB (perfluorocyclobutane), etc.

Figure 2E:
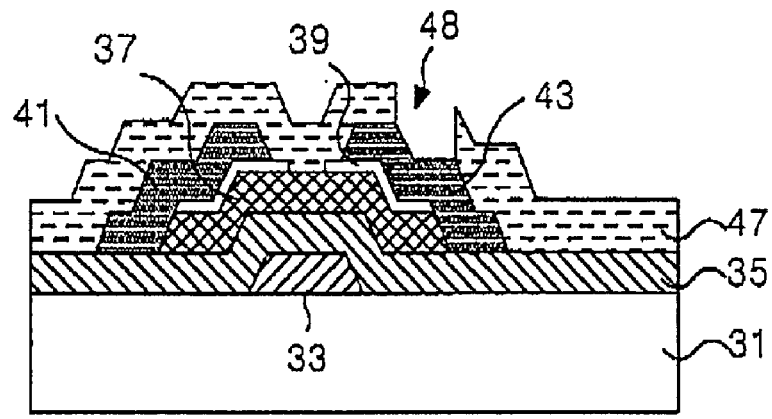

Referring to FIG. 2E, the passivation layer 47 is patterned by the photolithography to define a contact hole 48 for exposing the drain electrode 43. A transparent conductive material that can be but is not restricted to indium tin oxide (ITO), tin oxide (TO) or indium zinc oxide (IZO) is deposited onto the passivation layer 47 in such a manner as to be in contact with the drain electrode 43 via the contact hole 48. The transparent conductive material is then patterned by photolithography, thereby forming a pixel electrode 49.

Figure 2F:
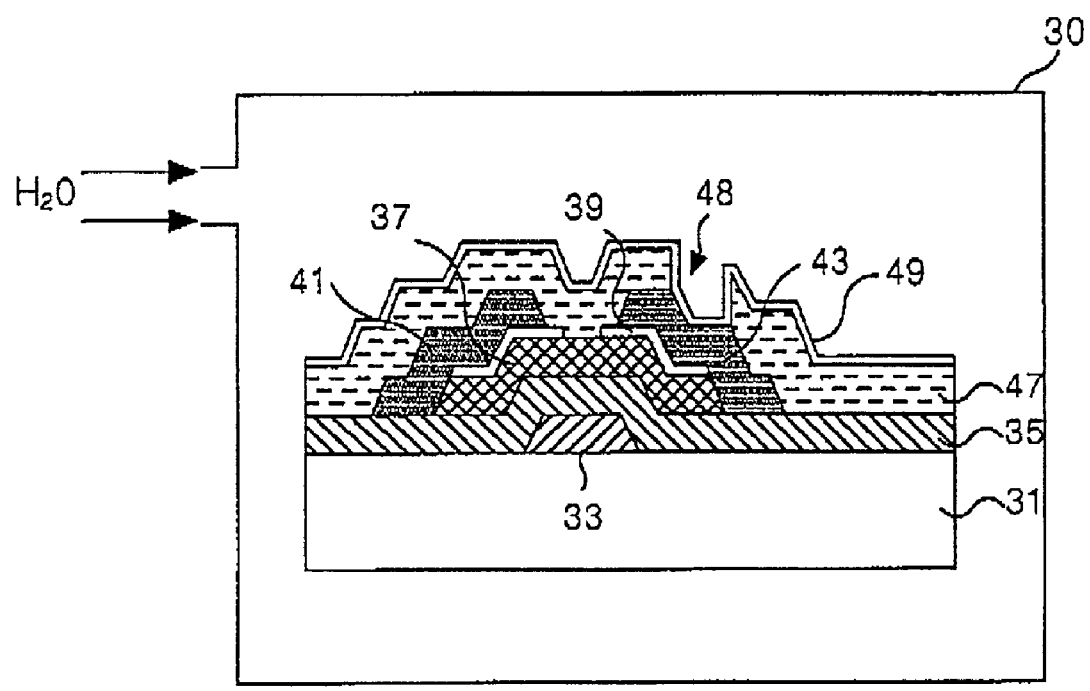

Referring to FIG. 2F, in order to operate a liquid crystal cell having the pixel electrode 49 provided over the substrate 31, the pixel electrode 49 is deposited by the sputtering technique after a RGB (red-blue-green) pattern was formed as a common electrode.

This process of depositing the pixel electrode 49 by sputtering is conducted at low temperature using a Hydrogen-containing gas such as a vapor, i.e., $H_2O$ gas, within a vacuum chamber 30. Here, low temperature means that a set temperature within the vacuum chamber 30 during sputtering is less than about 400° C. This allows the substrate temperature to be less than about 200° C., corresponding to half the set temperature, when the pixel electrode 49 is deposited in the vacuum chamber 30 having the temperature of less than about 400° C. In a preferred embodiment of the invention, the substrate has a temperature between about 50° C. and about 150° C.

Accordingly, the above-mentioned deposition requires no pre-heating, as was necessary in the conventional art, for high-temperature deposition. As a result, the process time can be shortened. Also, the deposition is made at low temperature in the vacuum chamber 30, so that the pixel electrode is amorphous, thereby permitting etching using a weak acid etchant.

Figure 2G:
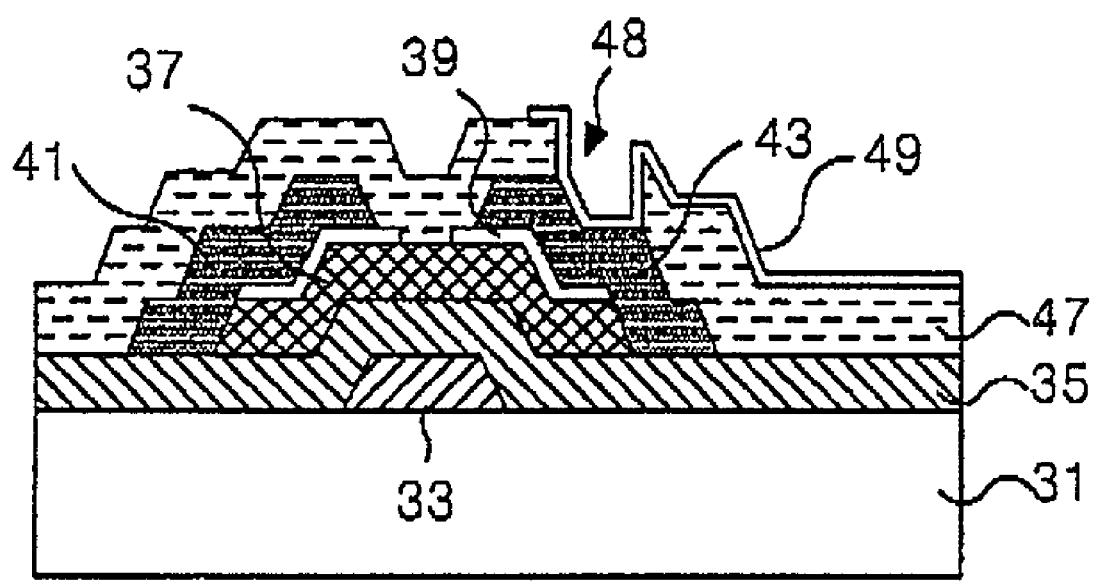

Etching the amorphous electrode using a weak acid etchant allows the etching time to be reduced to about one fifth to one sixth the time compared, to etching using a conventional art strong acid etchant technology. This also allows the baking process for the etch to be simplified. Furthermore, a weak acid etchant causes virtually no damage to the metal electrode and thereby assures a high yield. The weak acid etchant additionally virtually eliminates the possibility or leaving a residual substance film, owing to the fast etching rate of the pixel electrode film itself. Consequently, the pixel electrode 49 of the liquid crystal display is formed as shown in FIG. 2G.

As described above, the present invention deposes a pixel electrode by a sputtering technique conducted at a low temperature under a Hydrogen-containing gas, followed by an etch using a weak acid etchant, so that it becomes possible to shorten the etching process time as well as virtually eliminating damage to the metal.

Although the present invention has been explained by the embodiments shown in the drawings described above, it should be understood by a person having ordinary skill in the art that the invention is not limited to the embodiments, but rather that various changes or modifications thereof are possible without departing from the scope and spirit of the invention. Accordingly, the scope of the invention shall be determined only by the appended claims and their equivalents.

What is claimed is:

1. A method of fabricating a pixel electrode in a liquid crystal display including a switching device for driving the pixel electrode, the method comprising:
    depositing a protective film over a substrate to cover the switching device;
    defining a contact hole in the protective film to expose one electrode of the switching device; and
    forming the pixel electrode connected, via the contact hole, to said one exposed electrode, wherein the pixel electrode is formed by placing the substrate in a vacuum chamber and injecting hydrogen-containing gas at a temperature of less than about 400° C., wherein the substrate has a temperature between about 50° C. and about 150° C. when forming the pixel electrode, the substrate temperature being half said less than about 400° C. temperature and the pixel electrode has an amorphous structure.

2. The method as claimed in claim 1, wherein the pixel electrode is etched with a weak acid etchant.

3. The method as claimed in claim 1, further comprising the steps of:
    forming a gate electrode over the substrate;
    entirely depositing a gate insulating film over the substrate to cover the gate electrode; and
    continuously depositing an active layer and an ohmic contact layer to overlap the gate electrode.

4. The method as claimed in claim 1, wherein the protective layer is a passivation layer.

5. The method as claimed in claim 4, wherein the passivation layer is made from an inorganic insulation material or an organic insulation material.

6. The method as claimed in claim 4, wherein the passivation layer is at least one material selected from the group consisting of silicon nitride, silicon oxide, an acrylic, polytetrafluoroethylene, benzocyclobutene, fluoropolymer resin and perfluorocyclobutane.

7. The method as claimed in claim 1, wherein the pixel electrode comprises a transparent conductive material.

8. The method as claimed in claim 1, wherein the pixel electrode comprises at least one material selected from the group consisting of indium tin oxide, tin oxide and indium zinc oxide.

9. The method as claimed in claim 1, wherein the switching device has source and drain electrodes, and the source and drain electrodes comprise at least one material selected from the group consisting of Mo, Cr, Ti, Ta, MoW, MoTa and MoNb.

10. A pixel electrode in a liquid crystal display, which comprises:
    a substrate;
    a switching device over the substrate;
    a protective film over a substrate covering the switching device; and
    a contact hole in the protective film, the contact hole exposing one electrode of the switching device, the pixel electrode being connected, via the contact hole, to said one exposed electrode, wherein the pixel electrode is formed by placing the substrate in a vacuum chamber and injecting hydrogen-containing gas at a temperature of less than about 400° C., wherein the substrate has a temperature between about 50° C. and 150° C. when forming the pixel electrode, the substrate temperature being half said less than about 400° C temperature and the pixel electrode has an amorphous structure.

11. The pixel electrode as claimed in claim 10, which further comprises:
    a gate electrode over the substrate;
    a gate insulating film over the substrate covering the gate electrode; and
    an active layer and an ohmic contact layer overlapping the gate electrode.

12. The pixel electrode as claimed in claim 10, wherein the protective layer is an organic or inorganic passivation layer formed from at least one material selected from the group consisting of silicon nitride, silicon oxide, an acrylic, polytetrafluoroethylene, benzocyclobutene, fluoropolymer resin and perfluorocyclobutane.

13. The pixel electrode as claimed in claim 10, wherein the pixel electrode comprises a transparent conductive material selected from the group consisting of indium tin oxide, tin oxide and indium zinc oxide.

14. The pixel electrode as claimed in claim 10, wherein the switching device has source and drain electrodes, and the source and drain electrodes comprise at least one material selected from the group consisting of Mo, Cr, Ti, Ta, MoW, MoTa and MoNb.

* * * * *